No. 786,660. PATENTED APR. 4, 1905.
J. R. MOORE.
TIRE BOLT WRENCH.
APPLICATION FILED DEC. 12, 1904.
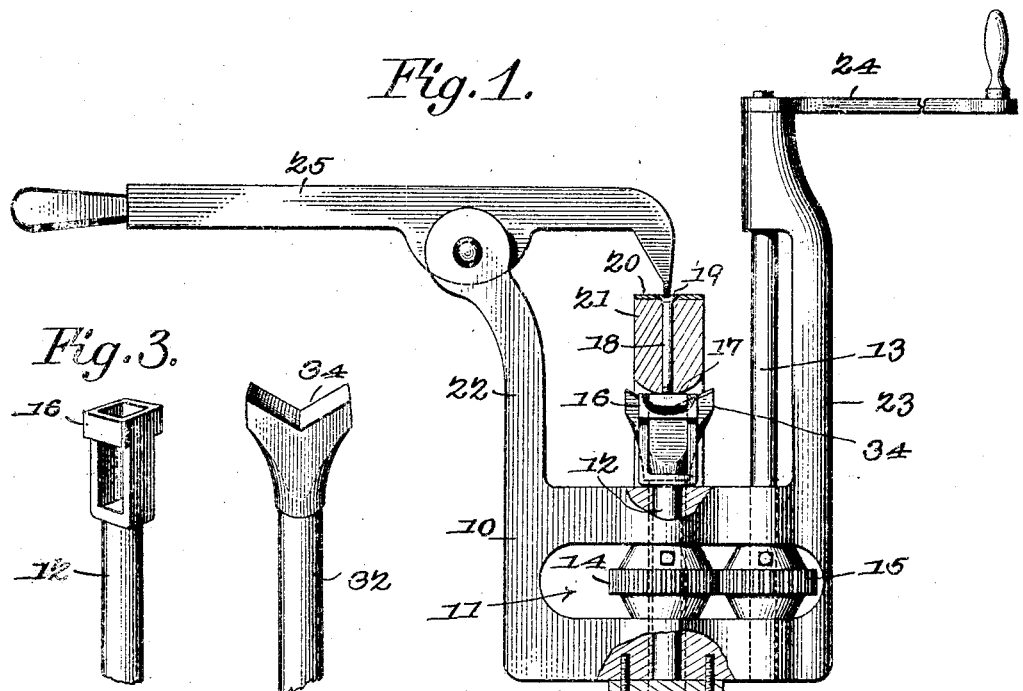
Fig. 1.
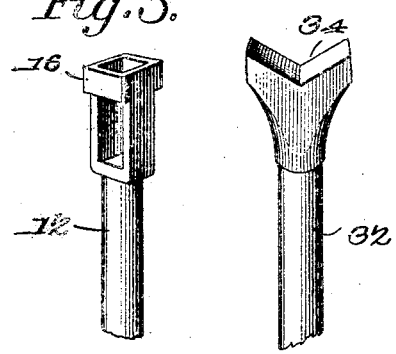
Fig. 3.
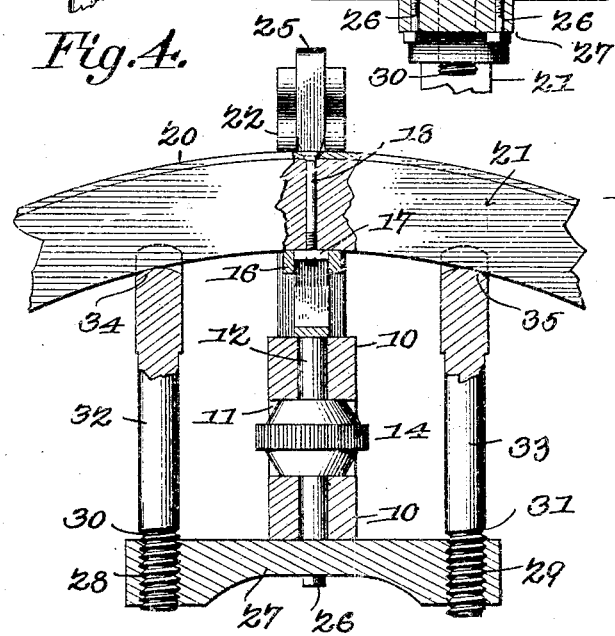
Fig. 4.
Fig. 2.
Witnesses
E. F. Stewart
C. N. Woodward
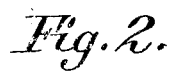
James R. Moore,
Inventor
by C. A. Snow & Co.
Attorneys No. 786,660.

Patented April 4, 1905.

UNITED STATES PATENT OFFICE.

JAMES R. MOORE, OF HARPER, TEXAS.

TIRE-BOLT WRENCH.

SPECIFICATION forming part of Letters Patent No. 786,660, dated April 4, 1905.

Application filed December 12, 1904. Serial No. 236,628.

*To all whom it may concern:*

Be it known that I, JAMES R. MOORE, a citizen of the United States, residing at Harper, in the county of Gillespie and State of Texas, have invented a new and useful Tire-Bolt Wrench, of which the following is a specification.

This invention relates to implements employed for holding bolts and rotating the nuts upon the same, and is applicable more particularly for attaching the holding-bolts to vehicle-tires, and has for its object to simplify and improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a side elevation partially in section, and Fig. 2 is a transverse sectional elevation of the improved device applied. Fig. 3 is a perspective view of a portion of the nut-holding member, and Fig. 4 is a similar view of a portion of one of the adjustable stop members.

The improved device comprises a supporting-frame 10, having a transverse aperture 11 and supporting spaced shafts 12 13 for rotation, the shafts extending through the aperture and carrying intermeshing gears 14 15, operating within the aperture. At one end the shaft 12 is provided with a socket 16, constituting a wrench for receiving the nut (represented at 17) of the tire-bolt 18, the head 19 of the bolt bearing within the countersunk aperture in the tire (represented at 20) and the nut bearing against the inner face of the felly (indicated at 21) of the usual form. The frame 10 is also provided with two standards 22 23, the shaft 13 extending through the standard 23 and provided with an operating-crank 24 for rotating the shaft, and thus in turn rotating the nut-engaging member 12, and the standard 22 carrying a lever 25 for bearing upon the head 19 of the bolt 18, and thus holding it stationary while the nut is being screwed thereon.

Attached, as by clamp-screws 26, to the frame 10 and extending transversely thereof is a bar 27, having threaded apertures 28 29 at the ends to receive the threaded ends 30 31 of two rods 32 33, the free ends of the rods forked, as at 34 35, for bearing against the adjacent face of the felly 21. By this means it is obvious that the frame 10 will be firmly supported relative to the felly 21 and held in position and prevented from all lateral or rotative movement, while at the same time all the necessary movements of the crank 24 and lever 25 are free to be made.

The stop members 32 33 may be readily adjusted, by means of their threaded ends, to adapt the device to different sizes and forms of tires.

Having thus described the invention, what is claimed is—

1. In a device of the class described, a frame, a wrench-carrying shaft journaled in said frame, a counter-shaft geared with the wrench-carrying shaft and having an operating-crank, a lever fulcrumed upon an upright extending from the frame and having a bolt-head-engaging point, a cross-bar secured to the under side of the frame and provided near its extremities with threaded apertures, and rim-engaging stop members having threaded ends adjustably engaging said apertures.

2. A frame having a transverse slot and provided with upwardly-extending brackets, a pair of shafts journaled in said frame and extending through the slot parallel to each other, one of said shafts having an additional bearing in one of the upwardly-extending brackets and the other shaft carrying a nut-engaging wrench member, intermeshing pinions secured upon said shafts within the transverse slot, a lever fulcrumed upon one of the upwardly-extending brackets and having a bolt-head-engaging point, a cross-bar secured to the under side of the frame and provided near its extremities with threaded apertures, and rim-engaging stop members having threaded ends adjustably engaging said apertures.

In testimony that I claim the foregoing as my own I have hereto affixed my signature in the presence of two witnesses.

JAMES R. MOORE.

Witnesses:
H. W. BIERSCHWALE,
R. L. HILLMAN.